United States Patent [19]

O'Reilly

[11] 3,907,211
[45] Sept. 23, 1975

[54] UNLOADING DEVICES

[75] Inventor: Daniel W. O'Reilly, Goodhue, Minn.

[73] Assignee: Joseph D. O'Reilly, Goodhue, Minn.

[22] Filed: Oct. 31, 1974

[21] Appl. No.: 519,553

Related U.S. Application Data

[63] Continuation of Ser. No. 378,685, July 12, 1973, abandoned.

[52] U.S. Cl. ............... 239/676; 239/680; 222/176; 222/386; 214/82
[51] Int. Cl.² ................... A01C 19/00; E01C 19/20
[58] Field of Search ............ 239/650, 662, 670–672, 239/676, 679–682, 684; 222/176, 178, 334, 203, 386, 386.5; 214/29, 44 R, 82, 83.3, 83.22; 296/28 D, 39 R

[56] References Cited
UNITED STATES PATENTS

| | | | |
|---|---|---|---|
| 2,529,608 | 11/1950 | Hueneman | 144/145 |
| 2,715,972 | 8/1955 | Grygill | 239/671 X |
| 2,788,136 | 4/1957 | Hebert et al. | 214/44 R X |
| 3,172,566 | 3/1965 | Mullin et al. | 222/176 X |
| 3,378,302 | 4/1968 | Doeglas et al. | 222/176 X |
| 3,389,815 | 6/1968 | Houser | 214/82 |
| 3,465,902 | 9/1969 | Colletti | 214/82 |
| 3,682,333 | 8/1972 | Krause | 214/82 |

FOREIGN PATENTS OR APPLICATIONS

| | | | |
|---|---|---|---|
| 1,114,095 | 9/1961 | Germany | 214/82 |
| 1,212,868 | 3/1966 | Germany | 198/221 |
| 945,873 | 7/1956 | Germany | 239/676 |

Primary Examiner—Robert S. Ward, Jr.
Attorney, Agent, or Firm—Lew Schwartz; Wayne A. Sivertson

[57] ABSTRACT

An unloading device for unloading bulk material from a boxlike enclosure in a uniform and controlled manner in which there is included members for prevention of compaction of bulk material, a novel drive mechanism, as well as means for preventing the unit from freezing during use in below freezing weather conditions.

20 Claims, 10 Drawing Figures

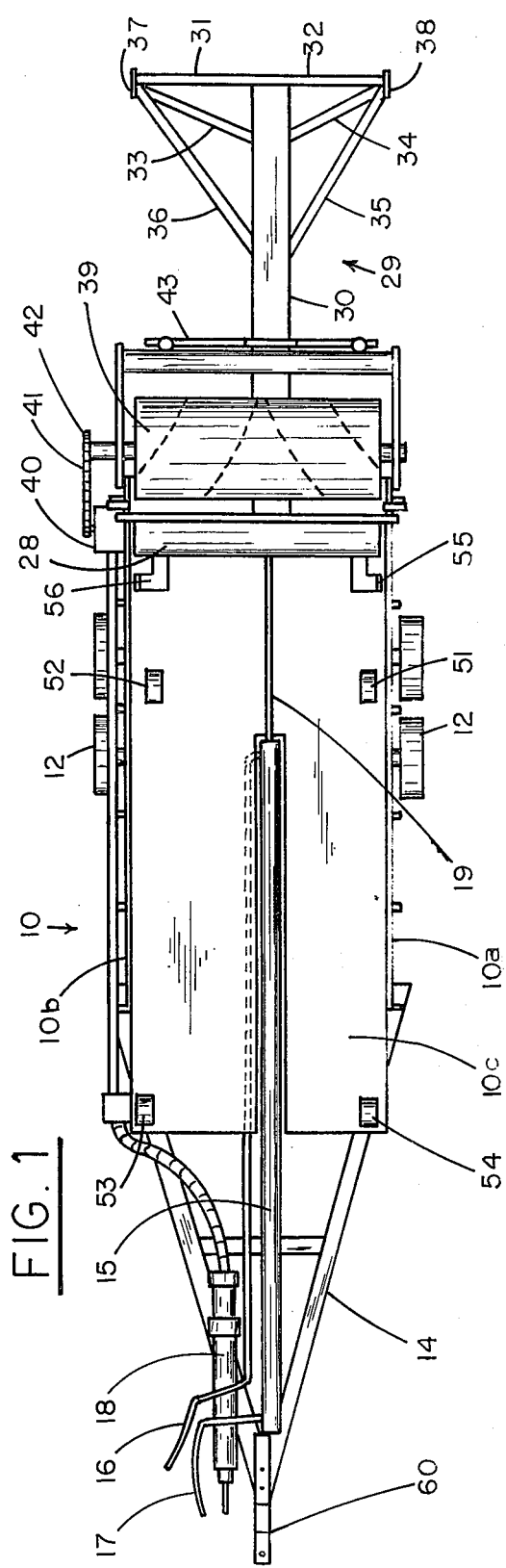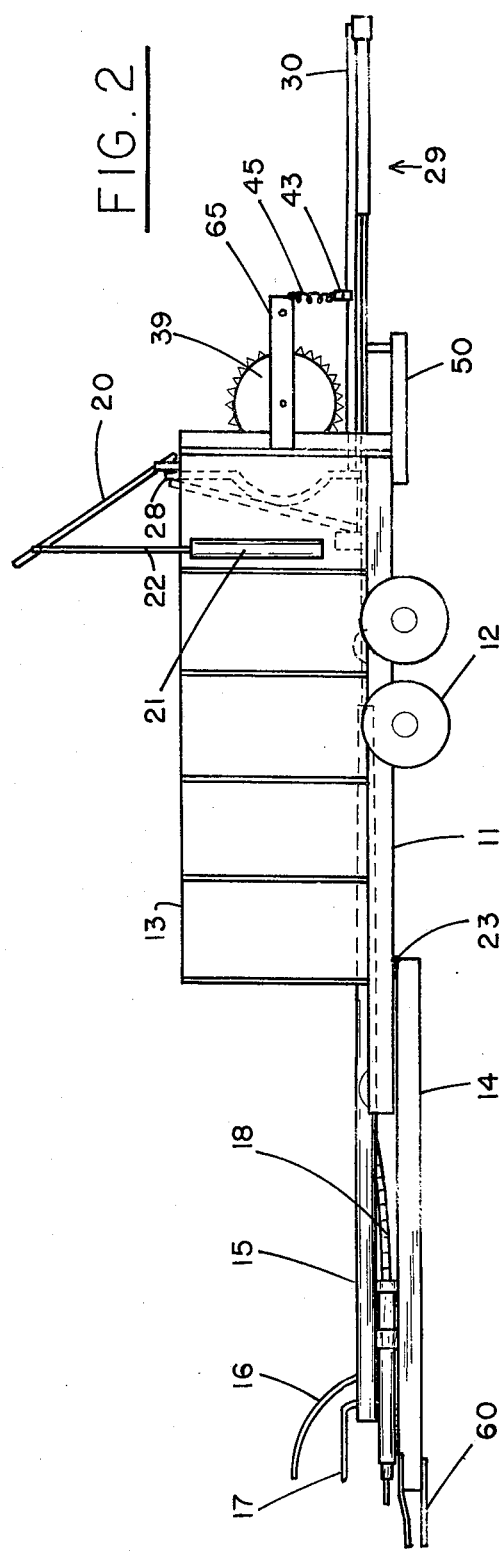

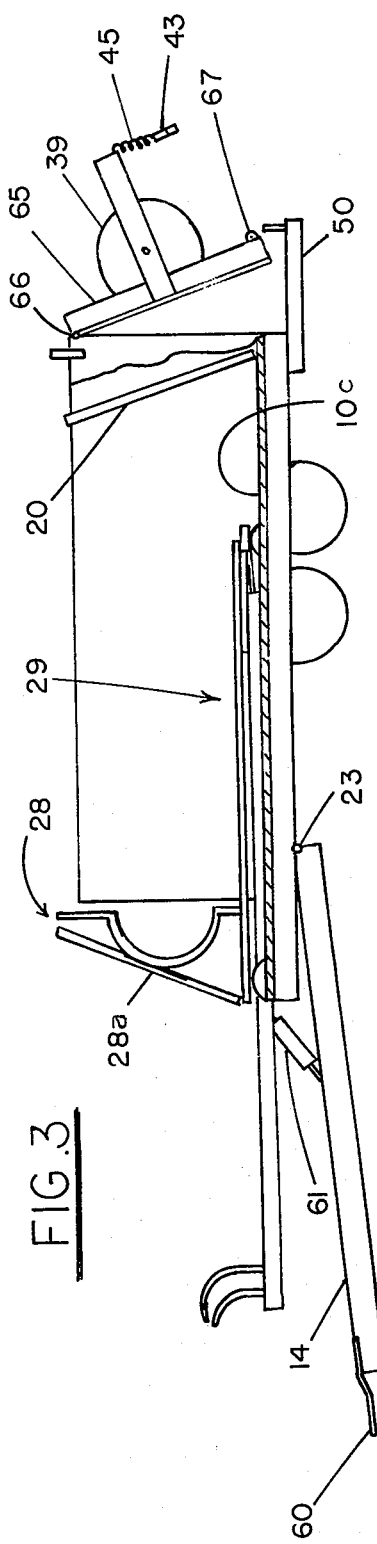
FIG. 3
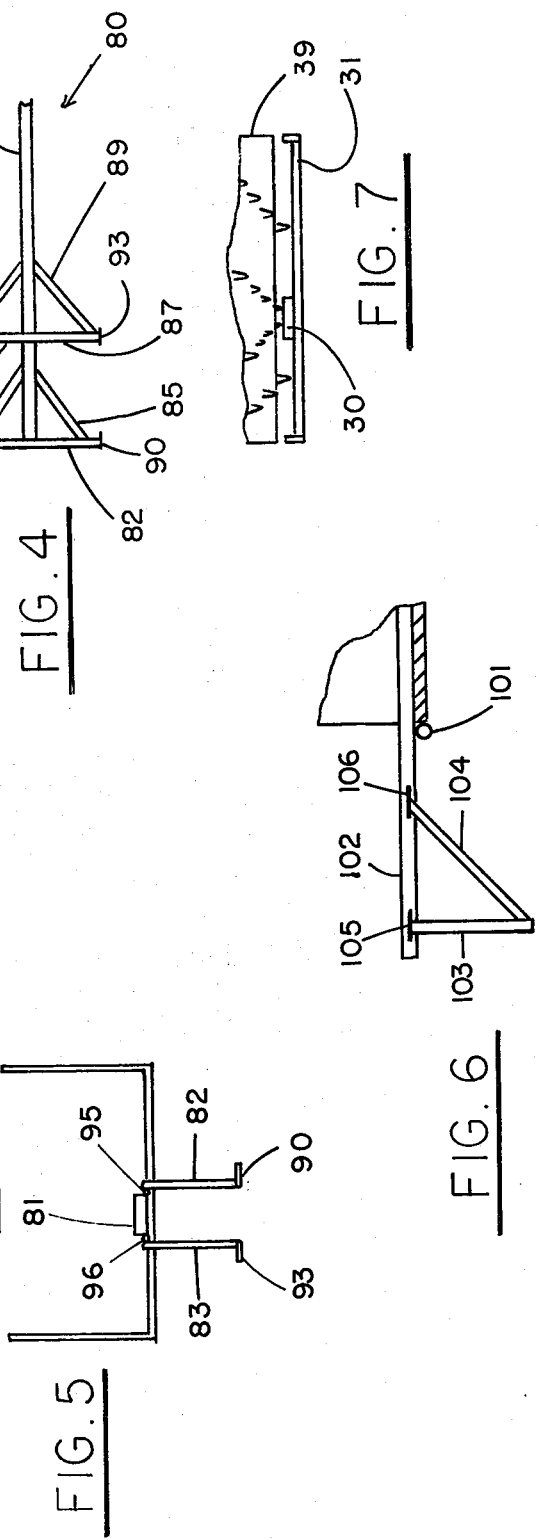
FIG. 4
FIG. 7
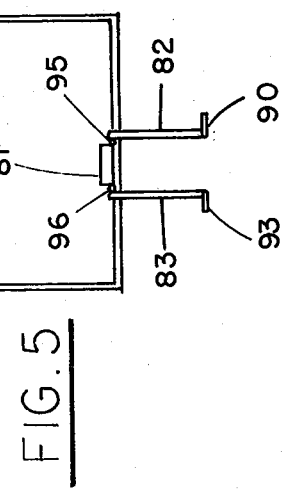
FIG. 5
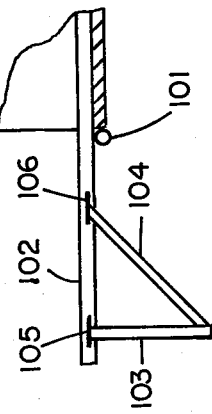
FIG. 6

UNLOADING DEVICES

This is a continuation of application Ser. No. 378,685, filed July 12, 1973 and now abandoned.

BACKGROUND OF THE INVENTION

1. Field of the Invention

This invention relates generally to vehicles or devices for unloading bulk material and, more specifically, to a device for unloading bulk material such as manure and the like.

2. Description of the Prior Art

The concept of unloading bulk materials with powered vehicles such as manure spreaders is well known in the art. Typically, the unloading units include a pusher such as an endless chain or a cable actuated false end gate for forcing the bulk material to the one end of the vehicle. For example, a typical manure spreader usually contains a pair of endless chains with slats therebetween which slide along the bottom of the spreader. The slats pull the manure into a rotating beater which spreads the manure over the field. Still another embodiment of the manure spreader is shown in the Webb et al. U.S. Pat. No. 2,263,748 which shows a sliding end gate pulled by a pair of cables. Similarly, another type of unloading device is shown in the Glass U.S. Pat. No. 3,211,308. The Glass patent also shows a system of cables for pushing material to the front of the forage box. These are typical of prior art units available and in use for unloading bulk material such as forage and manure. However, there are certain inherent disadvantages in these types of unloading devices. For example, the false end gate that pushes the bulk material to one end of the spreader compacts the manure as it forces the manure into the beater. Because the manure compacts as it moves into the beater, the manure unloads unevenly. Thus, as one starts the spreader the beater spins freely until the manure is compacted enough to slide into the beater. With a sliding end gate type of pusher at the back of the load, the manure becomes tightly compacted by the end gate and loosely compacted at the far end of the box. Consequently, the manure is spread thicker as the manure is unloaded. In fact, a sliding end gate is used as part of a packer unit in the Kuhnau U.S. Pat. No. 2,911,119 . Also, a pusher end gate used alone has a tendency to push bulk materials over the sides of the box thus spilling material without spreading it. One of the features of the present invention is that it overcomes the problems associated with the compaction of the bulk material such as manure. In addition, the present invention provides means for adjusting the horizontal position of the load to eliminate problems of spreading manure on slopes.

Another feature of the invention is that the spreader can accommodate loose manure as well as manure containing large amounts of bedding.

Another feature of the invention is the use of a hydraulic system to power the unloading of the manure.

Another feature of the invention is the means for preventing the unit from freezing during cold weather.

Still another feature of the invention is the unique power coupling unit between the tractor and the beater. The other features of the invention will be described hereinafter.

BRIEF SUMMARY OF THE INVENTION

Briefly, the present invention comprises the unloading device which is suitable for attachment to the power take-off of a conventional farm tractor and the preferred embodiment includes a boxlike member for receiving bulk material, a hydraulic pusher member that contains two pusher members, a first member that pushes against the bulk material and a second member that extends into the bulk material to prevent the bulk material from compacting as it is forced into the beater. The invention also includes a novel flexible drive shaft mechanism, means for cleaning and maintaining the pusher member which extends into the box, as well as means for preventing the pusher members from freezing to the spreader box in below freezing weather.

BRIEF DESCRIPTION OF THE DRAWINGS

Referring to the drawings, FIG. 1 shows a top view of my spreader;

FIG. 2 shows a side elevation view of my spreader;

FIG. 3 shows a side elevation view of my spreader with the side cut away to reveal the functional internal parts of my spreader;

FIG. 4 is a top view of one embodiment of my pusher member which prevents compaction of the bulk material;

FIG. 5 is an end view of FIG. 4 showing the folding arms in one embodiment of the pusher member;

FIG. 6 shows the guard members for repositioning the foldable pusher arms;

FIG. 7 shows the arrangement of the beater teeth with respect to my pusher member;

DESCRIPTION OF THE PREFERRED EMBODIMENT

Figure 8:
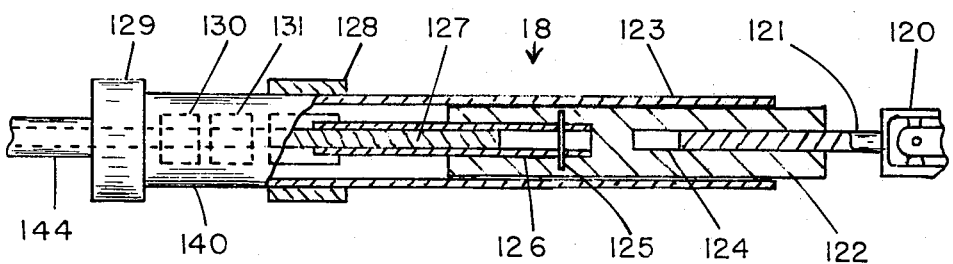
FIG. 8 shows a cross sectional view of my flexible drive shaft mechanism.
Figure 9:
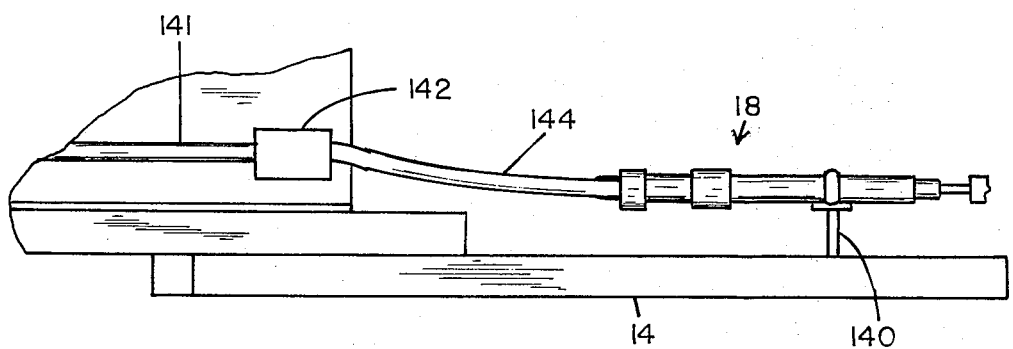
FIG. 9 shows the mounting of the flexible drive shaft on the frame of my manure spreader.

Referring to the drawings and more specifically, to FIGS. 1 and 2, reference numeral 10 generally designates my bulk loading device in which the preferred embodiment is a manure spreader. While I show and describe the invention as a manure spreader, it is apparent that my spreader can be used for unloading materials which have the bulk characteristics of manure as well, for example, lime or forage material could also be unloaded with my spreader. The spreader comprises a main frame 11 which has wheels 12 mounted thereon for rotatably supporting spreader 10 thus allowing spreader 10 to be transported over open fields. Pivotally attached to main frame 11 by pivot bolts 23 is a front frame 14 which contains a hitch 60 for connection to a pulling device such as a farm tractor. Spreader 10 includes a box comprised of side walls 10a and 10b a bottom 10c and a pair of end gates 20 and 28. Preferably the box is made from wood to prevent rapid freezing of bulk material to the box which occurs with the use of metal boxes. In an alternate embodiment of the invention, I use an inside and outside wood box with a layer of insulation therebetween.

In the loading position, end gate 28 is located in the front of the spreader 10, however, in FIG. 1 end gate 28 is shown in the extended position or unloaded position. A rear end gate 20 is provided which is powered by hydraulic cylinder 21 and extendible arm 22. Rear end gate 20 prevents the manure from falling into the beater during the loading process. When the spreader is in operation, end gate 20 is raised to the position shown in FIG. 2 by applying a signal to hydraulic cylinder 21 to cause arm 22 to become extended. In order to simplify the drawing, only one cylinder 21 is shown, however, in practice it is preferred to have one cylinder on each side of the spreader. Also, in an attempt to simplify the drawings the end gate 20 and hydraulic cylinders have been omitted from FIG. 1.

The beater which contains teeth or spikes for spreading the manure is designated by reference numeral 39 and is powered from a tractor through a power take-off shaft 18, a gear box 40, a chain drive 41 and a spur gear 42 located on the shaft supporting beater 39.

Referring to FIGS. 1, 2 and 3, the power mechanism for unloading the bulk material from the box comprises a hydraulic cylinder 15 which is powered through hydraulic lines 16 and 17. The advantage of my hydraulic cylinder is that the motion and the pusher members can easily and quickly be controlled by the tractor operator as well as provide a uniform unloading device. The hydraulic cylinder 15 contains an extendible rod 19 that attaches to my pusher member. Bottom 10c contains an opening so that a portion of cylinder housing 15 and 19 can extend therethrough so rod 19 can be attached to pusher member 29. Attachment to pusher member 29 is preferably made at the end of member 30 by a clevis or pin. Thus, in the event of breakdown the load can be unloaded by extending rod 29. The purpose of the opening around cylinder 15 is to allow any material behind the end gate to fall through the opening when the end gate is returned to a front position. Pusher member 29 actually comprises two members which are fastened together and simultaneously powered by hydraulic cylinder 15. The first pusher member is end gate 28 which extends upward in a vertical position to push on the bulk material and the second member is pusher member 29 which extends in a horizontal direction into the bulk material in spreader 10. End gate 28 is shown with a curved section and a covering shroud 28a to better facilitate the unloading of the bulk material as the end gate approaches the beater 39. In the extended position of end gate 28, the lower edge of end gate 28 extends slightly beyond the lip of the box to insure that all the bulk material is pushed out of the box during the unloading operation.

In FIGS. 1 and 2, the pusher members are shown in the extended position while in FIG. 3 the pusher members are shown in the retracted position. Second pusher member 29 comprises a straight section 30, a pair of arms or wing bars 31 and 32 that extend out from straight section or member 30. Arms 31 and 32 are braced for support by members 33, 36, 34 and 35 respectively. Located at the end of arm 31 is a guide shoe 37 and similarly located at the end of arm 32 is a guide shoe 38. Also located on the end gate 28 are guide shoes 55 and 56. The purpose of guide shoes is to maintain the orientation of the pusher members with respect to the spreader box by engaging the side walls of the spreader 10 and thereby prevent twisting of the pusher member when hydraulic cylinder 19 is actuated. It is this second pusher member 29 in conjunction with end gate 28 which extends into the bulk material that has been found to prevent compaction of the bulk material as well as preventing the spillage of material over the sides of the box. The operation is not fully understood but it is believed that the support members or wing bars tend to direct the bulk material away from the sides of the spreader thus reducing the sidewall friction and eliminating the spillage over the sides. In addition, the center member 30 and the arms and supports also partially support the load of bulk material.

Located within the box spreader 10 is a set of antifreeze blocks 51, 52, 53 and 54. These blocks which are small ramps provide for elevation of the pusher members during storage. The blocks lift and maintain the pusher mechanism off the floor of the spreader so that the pusher members 28 and 29 cannot freeze to the bottom of the spreader. The only part of the pusher mechanisms which can freeze are those points in contact with the antifreeze blocks, however, since the surface area is quite minimal, one can easily free the pusher members by applying a signal to power cylinder 15.

Figure 3A:
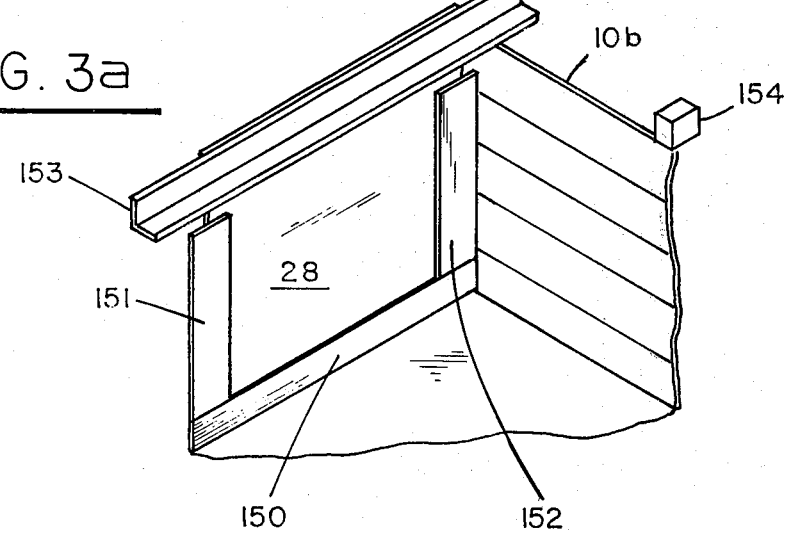
FIG. 3a is a perspective view of my end gate and side wall scrapers.

Referring to FIG. 3a, reference numeral 28 indicates the end gate and reference numeral 10b indicates one side of the box. This detail reveals two additional features of the invention, namely, scrapers 150, 151 and 152. These scrapers are flexible enough to prevent binding of end gate against the walls of the box but stiff enough to bend backward and not allow the bulk material to slip past end gate 28. A typical suitable material is rubber, belting, plastic or the like.

Located on top of end gate 28 is a channel iron 153 that serves a dual function. The first function is to scrape the top edges of the box to remove any bulk material that falls thereon. The second purpose is to coact with stop 154 to prevent end gate 28 from accidentally engaging beater 39.

Referring to FIG. 3, the operation of the until will become more apparent. In FIG. 3 the false end gate 28 or first pusher member is shown in its front position storage position. In the storage position, the pusher members are resting on the antifreeze blocks which comprise ramped blocks. However, prior to loading the pusher members are displaced slightly rearward so that the bottom of the pusher members rest on the bottom 10c of spreader 10. This is called the loading position. It is apparent that in the loading position the second pusher member 29 is located about in the middle of spreader 10. In loading the bulk material is dumped on top of second pusher member 29. The bulk material is held in confinement by false end gate 28, the side wall 10a and 10b and the rear end gate 20. When the spreader has been loaded and ready for spreading, one can raise end gate 20 so that the bulk material can be forced into beater 39. While I show a rear end gate 20, it is apparent that end gate need only be used for bulk materials which are sloppy and would tend to spill out of the spreader during loading.

Further features of the invention which are shown in FIG. 3 are the concept of my break away beater housing 65 which is pivotally fastened to spreader 10 by pivot member 66. The bottom of beater housing 65 is held in contact with the rear of spreader 10 through a set of break away pins 67 which are located on both sides of spreader 10. FIG. 3 shows the breakaway pin broken. The purpose of break away pin 67 is so that if there should be hard material or frozen material in the spreader, the pusher members will not break the beater by forcing the frozen material into the beater but instead would break the break away pins thus allowing the beater to swing free without any damager thereto. In addition, the pivot members may be removed to allow the use of the box for unloading without spreading.

Another aspect of my invention shown in FIG. 3 is the tiltable bed comprised of frame 11 and frame 14 which has a hydraulic cylinder 61 that connects to frame 11. By extending or retracting cylinder 61 one can tilt the bed of spreader 10 to the desired position. Thus, the operator can adjust the spreader for going downhill or uphill.

Another feature of the invention shown in FIGS. 1, 2 and 3 is guide or support 50 for pusher member 29. Support 50 provides vertical support to arm 30 as it extends beyond the rear of the spreader. In addition, I provide a scraper 43 which fastens to frame 65 through a pair of helical springs 45. The helical springs hold the edge of scraper 43 against the top portion of pusher member 29 as well as allow the scraper member to flex inward or outward. That is, as pusher member 29 moves outward, helical springs 45 allow scraper 43 to flex rearward as well as upward. This enables scraper 43 to always maintain pressure contact with the member 30 and thereby scrape any loose material off member 30. Member 30 has been shown as flat with a top parallel to bottom 10c of spreader 10. However, in an alternate embodiment, member 30 has a cross sectional shape of an isosceles triangle to allow the bulk material to slide off by gravity.

Referring to FIG. 4, an alternate embodiment of my wing bars or second pushing member 29 is designated by reference numeral 80. Wing bar 80 is substantially the same as the pusher shown in FIG. 1 except that the member 81 contains a pair of wing bars or pushing members which extend into the bulk material. The unit comprises arms 81 and 86, angle supports 88 and 89 and arms 82 and 83 and angle supports 84 and 85. Both of these members have guide shoes as indicated by reference numerals 91 and 92, 90 and 93. Thus, a modification of the invention is the use of two wing bars for extending into the bulk material to provide more contact with the bulk material.

In addition to the modification of the wing bars by use of two members, FIG. 5 shows an additional modification of pivotal mounting arms 82 and 83 to member 81 by hinges 95 and 96. With this embodiment, arms 82 and 83 fall downward after having passed under the beater thus eliminating the need for a scraper.

A reference to FIG. 6 shows how a wing bar would appear in a side view. Note arm 103 and angle support 104 are fastened by hinges 105 and 106 to member 102 which could be substituted for member 30. Also, a roller guide 101 is located at the rear of the spreader 10 to engage angle support arm 104 to gradually lift the wing bar up to the horizontal position for pulling into the spreader.

FIG. 7 shows an end view of the wing bars and beater to illustrate that the teeth are shorter in the region that passes over member 30. This allows one to maintain a uniform minimum clearance under the entire length of the beater.

Referring to FIG. 8, my novel flexible drive mechanism 18 from the tractor to spreader beater 39 is shown in cross section. The drive unit comprises a rigid shaft 141 that runs through a transfer box 142, a wire cable 127 which runs through a curved housing 144 connecting to unit 18 which is pivotally mounted to frame 14 by support 140. More specifically, the unit 18 comprises a housing 123, a conventional power take-off shaft 12o, a spline shaft 121 for fitting into a splined opening 124 located in member 122. Splined shaft 121 is allowed to slide within member 122 and thus compensate for any variations in hookup of the spreader to the tractor. Located on the other end of member 122 is another opening which contains a pipe 126 which is pinned to member 122 by a pin 125. Located inside pipe 126 is a portion of my flexible steel wire cable 127 which is brazed to the pipe to form integral engagement with pipe 126. The flexible cable 127 extends through a section of a flexible hose 140 comprised of a sleeve with a coil spring on the outside and into housing 144 which fastens to the gear box 142. Located within the flexible hose section 140 are bushings 130 and 131 which prevent the flexible wire cable from rubbing against flexible hose 140.

The purpose of the flexible mechanism 18 as shown in FIG. 8 is to allow for contraction of the cable as one applies the load by allowing member 122 to slide within housing 123. That is, as one applies torque to the power take-off shaft 121, flexible cable 127 tightens up thus causing the cable to shorten. Thus, the present drive mechanism allows for this contraction or shortening of the cable without providing an undue torque to the housing itself. I have found that this arrangement will operate exceedingly well under rpm conditions of as high as 1,000 rpm and thus replace conventional universal type connections.

Thus, it will be apparent that my machine is much simpler and easier to repair and adjust than prior art spreaders. For example, if one wishes to adjust the rate of discharge of the bulk material by controlling the speed of the end gate, all one has to do is adjust the amount of hydraulic fluid supplied to hydraulic cylinder 15 by either inserting a different orifice into the hydraulic line or use available supply hydraulic valve.

One other feature of my flexible drive shaft is that I have discovered to utilize a flexible shaft under load conditions of 25 to 30 horespower, it is necessary to have a flexible cable in which the twist of the strands of the cable is in the same direction as the lay or twist of the strands around the core of the cable. Typically, I can use a 1 inch flexible shaft to transmit up to 30 horespower in contrast to available prior art flexible shafts which are unable to handle these horsepower requirements without unraveling.

I claim:

1. In a bulk material unloading device of the type having a boxlike member for receiving said bulk material defined by two generally opposing side walls and a bottom and having an end gate movable along said bottom in a path between said side walls for pushing said bulk material out of said boxlike member, the improvement which comprises:

means extending from said end gate and movable therewith along said bottom for providing a supporting surface for at least a portion of said bulk material.

2. The device of claim 1 wherein said extending means comprises means coacting with said end gate and extending therefrom along said bottom in the general direction of said path for providing a supporting surface for at least a portion of said bulk material.

3. The device of claim 2 wherein said end gate and said coacting means are provided with means for engaging said side walls to maintain the orientation of said end gate and said coacting means relative to said side walls.

4. The device of claim 2 wherein said coacting means comprises first means extending from said end gate intermediate said side walls, and second means extending from said first means toward each of said side walls.

5. The device of claim 4 wherein said second means comprise:
   at least one arm extending toward each of said side walls; and
   means extending between said arms and said first means for partially supporting said bulk material while directing said bulk material away from said side walls.

6. The device of claim 5 wherein said arms and said end gate are provided with means for engaging said side walls to maintain the orientation of said end gate and said coacting means relative to said side walls.

7. A device for spreading bulk material which comprises:
   a frame;
   a boxlike member mounted on said frame for receiving said bulk material, said boxlike member including two generally opposing side walls, a bottom and at least one open end;
   beater means carried by said boxlike member adjacent said open end;
   end gate means within said boxlike member and movable toward said open end for delivering said bulk material to said beater means; and
   means extending from said end gate means and movable therewith along said bottom for supporting at least a portion of said bulk material.

8. The device of claim 7 wherein said extending means comprises means coacting with said end gate means and extending therefrom toward said open end for supporting at least a portion of said bulk material.

9. The device of claim 8 wherein said end gate means and said coacting means are provided with means for engaging said side walls to maintain the orientation of said end gate means and said coacting means relative to said side walls.

10. The device of claim 8 wherein said coacting means comprises first means extending from said end gate means intermediate and said walls, and second means extending from said first means toward each of said side walls.

11. The device of claim 10 wherein said second means comprise:
   at least one arm extending toward each of said side walls; and
   means extending between said arms and said first means for partially supporting said bulk material while directing said bulk material away from said side walls.

12. The device of claim 11 wherein said arms and said end gate are provided with means for engaging said side walls to maintain the orientation of said end gate and said coacting means relative to said side walls.

13. The device of claim 12 further comprising means for imparting motion to said end gate means and said extending means, said motion imparting means comprising hydraulic means connected to said first means.

14. The device of claim 7 further comprising antifreeze block means for spacing said end gate means and said extending means from said bottom during storage.

15. The device of claim 7 further comprising means for selectively closing said open end.

16. The device of claim 7 further comprising means for tilting said boxlike member relative to said frame.

17. The device of claim 7 wherein said beater means is pivotally carried by said boxlike member and secured over said open end by breakaway pins.

18. The device of claim 10 wherein said second means are secured to said first means by hinge means for allowing said second means to collapse when said second means pass out of said boxlike member through said open end.

19. The device of claim 18 further comprising guide means for raising said second means when said second means are brought into said boxlike member through said open end.

20. The device of claim 11 wherein there are two arms extending toward each of said walls.

* * * * *

PO-1050
(5/69)

UNITED STATES PATENT OFFICE
CERTIFICATE OF CORRECTION

Patent No. 3,907,211          Dated

Inventor(s)    Daniel W. O'Reilly

It is certified that error appears in the above-identified patent and that said Letters Patent are hereby corrected as shown below:

Column 4, line 33, "until" should be -- unit --.

Column 6, line 1, "12o" should be -- 120 --.

Claim 10, line 3, "and said walls" should be -- said side walls --.

Signed and Sealed this

*twenty-third* Day of *December 1975*

[SEAL]

*Attest:*

RUTH C. MASON
*Attesting Officer*

C. MARSHALL DANN
*Commissioner of Patents and Trademarks*